United States Patent
Olson et al.

(10) Patent No.: US 12,491,280 B2
(45) Date of Patent: Dec. 9, 2025

(54) STERILIZATION CYCLE WITH ENHANCED DIFFUSION

(71) Applicant: Sterilucent, Inc., Minneapolis, MN (US)

(72) Inventors: Steven J. Olson, Mahtomedi, MN (US); Kent A. Larson, Woodbury, MN (US); Nicole Williams, Minneapolis, MN (US); Patrick J. LaValley, Elk River, MN (US); Patrice J. Amoapim, Eden Prairie, MN (US); Peter R. Kalkbrenner, Eden Prairie, MN (US); Roger P. Martin, Eden Prairie, MN (US); Robert J. Gaskill, Edina, MN (US)

(73) Assignee: STERILUCENT, INC., Minneapolis, MN (US)

( * ) Notice: Subject to any disclaimer, the term of this patent is extended or adjusted under 35 U.S.C. 154(b) by 487 days.

(21) Appl. No.: 18/129,606

(22) Filed: Mar. 31, 2023

(65) Prior Publication Data

US 2023/0338599 A1    Oct. 26, 2023

Related U.S. Application Data

(60) Provisional application No. 63/473,038, filed on Apr. 25, 2022.

(51) Int. Cl.
*A61L 2/24* (2006.01)
*A61L 2/20* (2006.01)

(52) U.S. Cl.
CPC .................. *A61L 2/24* (2013.01); *A61L 2/20* (2013.01); *A61L 2/208* (2013.01);
(Continued)

(58) Field of Classification Search
CPC ........ A61L 2/24; A61L 2/208; A61L 2202/11; A61L 2202/121; A61L 2202/122;
(Continued)

(56) References Cited

U.S. PATENT DOCUMENTS

| 4,348,357 A | 9/1982 | Bitchell |
| 4,643,876 A | 2/1987 | Jacobs et al. |

(Continued)

FOREIGN PATENT DOCUMENTS

| EP | 0474137 A2 | 3/1992 |
| EP | 3566722 A1 | 11/2019 |

OTHER PUBLICATIONS

A.B. Donaldson et al. Unsteady-state temperature distribution in a convecting fin of constant area, Appl. Sci., Res., 26 (1-2) (May 1972), pp. 75-85.

(Continued)

*Primary Examiner* — Sean E Conley
*Assistant Examiner* — Aham Lee
(74) *Attorney, Agent, or Firm* — Bradley J. Thorson; DeWitt LLP

(57) ABSTRACT

A sterilization cycle for sterilizing material and items containing diffusion restricted spaces and lumens is provided that introduces vaporous sterilant, such as hydrogen peroxide, into the chamber in a controlled manner such that diffusion within the restricted spaces and lumens is enhanced as a precursor to additional sterilization steps thereby enhancing overall sterilization.

20 Claims, 10 Drawing Sheets

(52) U.S. Cl.
CPC ...... *A61L 2202/11* (2013.01); *A61L 2202/121* (2013.01); *A61L 2202/122* (2013.01); *A61L 2202/123* (2013.01); *A61L 2202/14* (2013.01); *A61L 2202/15* (2013.01); *A61L 2202/24* (2013.01)

(58) Field of Classification Search
CPC ........... A61L 2202/123; A61L 2202/14; A61L 2202/15; A61L 2202/24; A61L 2202/18
See application file for complete search history.

(56) References Cited

U.S. PATENT DOCUMENTS

| | | | |
|---|---|---|---|
| 4,952,370 A | 8/1990 | Cummings et al. | |
| 4,956,145 A | 9/1990 | Cummings et al. | |
| 5,084,239 A | 1/1992 | Moulton et al. | |
| 5,317,896 A | 6/1994 | Sheth et al. | |
| 5,482,683 A | 1/1996 | Sheth et al. | |
| 5,492,672 A | 2/1996 | Childers et al. | |
| 5,527,506 A | 6/1996 | Childers et al. | |
| 6,261,518 B1 | 7/2001 | Caputo et al. | |
| 6,365,102 B1 | 4/2002 | Wu et al. | |
| 6,451,254 B1 | 9/2002 | Wang et al. | |
| 6,599,471 B2 | 7/2003 | Jacobs et al. | |
| 6,673,313 B2 | 1/2004 | Wang et al. | |
| 7,186,372 B2 | 3/2007 | Kohler et al. | |
| 7,880,887 B2 | 2/2011 | Olson et al. | |
| 8,366,995 B2 | 2/2013 | McLaren et al. | |
| 9,480,763 B2 | 11/2016 | Dufresne et al. | |
| 9,480,764 B2 | 11/2016 | Tremblay et al. | |
| 9,814,795 B2 | 11/2017 | Dufresne et al. | |
| 10,350,319 B2 | 7/2019 | Olson et al. | |
| 10,383,966 B2 | 8/2019 | Dufresne et al. | |
| 2003/0235511 A1 | 12/2003 | Jacobs et al. | |
| 2010/0313441 A1 | 12/2010 | McLaren et al. | |
| 2010/0316527 A1 | 12/2010 | McLaren et al. | |
| 2018/0207306 A1 | 7/2018 | Olson et al. | |
| 2022/0331470 A1* | 10/2022 | Shodder | A61L 2/24 |

OTHER PUBLICATIONS

J.C. Slattery et al., Calculation of the Diffusion Coefficient of Dilute Gases and of the Self-diffusion Coefficient of Dense Gases, A.I. Ch.E Journal, vol. 4, No. 2, (Jun. 1958) pp. 137-142.

Korean Intellectual Property Office, International Search Report and Written Opinion of the International Search Authority dated Jul. 18, 2024 in the corresponding International Application No. PCT/US2024/021043, 8 pages.

* cited by examiner

STERILIZATION CYCLE WITH ENHANCED DIFFUSION

CROSS-REFERENCE TO RELATED APPLICATIONS

This application is a non-provisional application of Application No. 63/473,038, filed Apr. 25, 2022, and claims priority from that application which is also deemed incorporated by reference in its entirety in this application.

STATEMENT REGARDING FEDERALLY SPONSORED RESEARCH OR DEVELOPMENT

Not Applicable

BACKGROUND OF THE INVENTION

Field of the Invention

The present invention relates to the sterilization of medical devices and, more particularly, to the sterilization of medical devices that contain lumens and other restricted spaces using a vapor-phase sterilant.

Description of the Prior Art

Low temperature application of hydrogen peroxide vapor is highly effective when sterilizing objects that have open and accessible surfaces, which allow the hydrogen peroxide vapor to easily surround and contact all surfaces of the object and sterilize them. To date, low temperature application of hydrogen peroxide vapor has proven to be more difficult when sterilizing objects having diffusion limited interiors and particularly long, narrow lumens. This is because hydrogen peroxide vapor degrades to water and oxygen over time when contacting the materials used to form the surface of such lumens. Thus, the hydrogen peroxide vapor degrades as it diffuses into the interior of the lumen due to the large surface to cross-section ratio of the lumen. Water droplets collecting in the interior of the lumen can also block the passage of hydrogen peroxide vapor into the lumen. This degradation and possibility of blockage limit the diametric size and lengths of lumens that can be sterilized with current vapor-phase hydrogen peroxide systems. There is a need for improved systems and methods to enhance the penetration of vapor sterilant down long narrow objects such as the lumens of more complex devices.

A variety of methods have been employed to sterilize objects having long, narrow lumens, but each of these methods has shortcomings. Liquid sterilants have been employed in systems commonly referred to as endoscope reprocessors. These systems can combine some of the cleaning and disinfecting steps into a single device. Reprocessors can provide high level disinfection but are incapable of sterilizing channeled medical devices or providing terminal sterilization.

Dry boosters and wet boosters have been coupled to lumen devices for sterilization purposes. A dry booster is an object with an internal volume that is typically coupled to one end of the lumen of a device before the device is placed in a vacuum chamber. When the lumen and booster are at a vacuum, the sterilant vapor then added to the vacuum chamber passes through the lumen to fill in the void space of the booster. A wet booster is like a dry booster in that it is attached to a lumen device to be sterilized before the device is placed in the vacuum chamber. In the case of a wet booster, liquid sterilant is contained in the booster that vaporizes as the vacuum chamber is evacuated. This draws sterilant vapor from the wet booster through the lumen to sterilize the device. Dry and wet boosters are time consuming and clumsy to use. The use of such devices also introduces mated surfaces between the booster and the lumen device which are difficult to sterilize and may result in non-sterile devices.

Special sterilization trays have also been described in the prior art. These trays have a sealable barrier defining two volumes. The tray is also equipped so that a pressure differential can be created between the two volumes. When these trays are employed the lumen device is placed across the sealable barrier with the two ends of the lumen on opposite sides of the barrier. When sterilant is added to the higher-pressure side of the barrier, the pressure differential causes the sterilant to flow through the lumen device toward the lower pressure side of the barrier to sterilize the lumen. Such sterilization trays are also cumbersome to use and introduce mated surfaces between the barrier and channel wall defining the lumen of the device which are difficult to sterilize and may result in non-sterile devices.

Higher concentration of hydrogen peroxide vapor is more effective for sterilization, however, the concentration of aqueous hydrogen peroxide that can be shipped by air, is limited to 59% and requires that only small volumes are present in each container. Several methods have been described in the prior art to increase the vapor concentration above that of 59% hydrogen peroxide by removing water. Increasing the vapor concentration of hydrogen peroxide outside a lumen provides a greater potential for the hydrogen peroxide to diffuse into a lumen before degrading to low levels. These methods seek to remove some of the water vapor with a vacuum pump while retaining much of the hydrogen peroxide. While these methods have improved lumen penetration, it has come at the cost of greater material degradation of the items that are sterilized due to the exposure to highly concentrated hydrogen peroxide vapor.

The prior art methods described above have shortcomings solved by the present invention. The present invention allows full sterilization of the load even when the load includes devices having long, narrow lumens. In addition, the present invention does not employ special devices that must be coupled to the lumen device or special trays of the type described above. Finally, the present invention does not increase the overall concentration of hydrogen peroxide prior to use but distributes the concentration of hydrogen peroxide to the inside of lumens by diffusion leading to reduced sterilant use and maintaining overall material compatibility with the sterilization process.

SUMMARY OF THE INVENTION

To overcome the problems associated with prior art lumen sterilization methods an object of the present invention is to provide a sterilization system and method with enhanced sterilant penetration into lumen devices.

Another object of the invention is to provide a sterilization system and method that can be used for a variety of load sizes at varying load temperatures.

Still another object of the invention is to provide a sterilization system and method that optimizes the amount of sterilant used to save sterilant and enhance material compatibility.

DESCRIPTION OF THE PREFERRED EMBODIMENT

Figure 1:
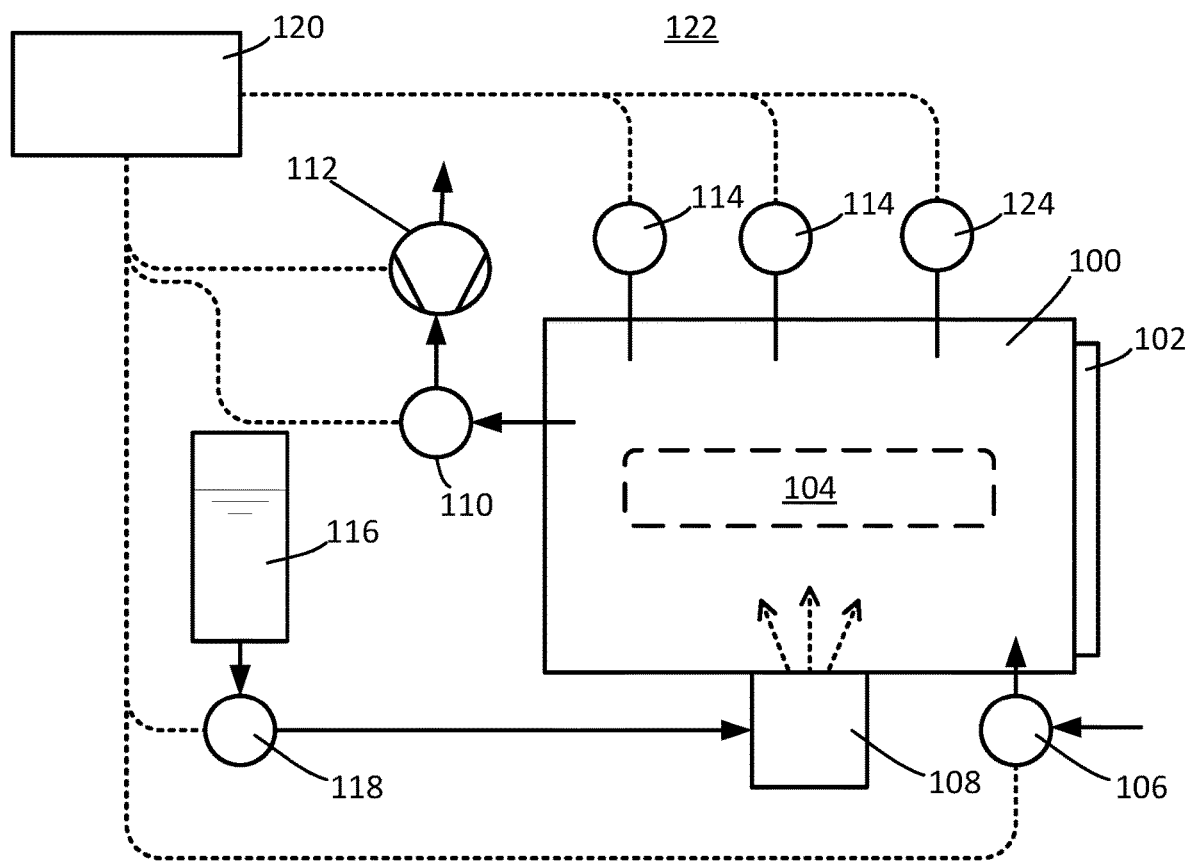
FIG. 1 is a block diagram representation of a chemical-vapor sterilization system.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise. In addition, the terms sterilant gas and sterilant vapor are used interchangeably and refer to the sterilant in a gas phase that may or may not condense on objects depending on the chamber conditions.

Referring now to the invention in more detail, in FIG. 1 there is shown a block diagram for a vapor-chemical sterilization system that employs a sterilant like hydrogen peroxide. Note: A gaseous-chemical sterilant and a vapor-chemical sterilant both utilize the sterilant in gas-phase, but a vapor-chemical sterilant could exist with solid and/or liquid phase sterilant at the temperature of the sterilization process, while a gaseous-chemical sterilant is purely in gas phase. The sterilization process is conducted in a sterilization chamber 100. The interior of the sterilization chamber 100 is accessible through a chamber door 102 that may open with a hinge, a sliding mechanism, or by other means, which can be closed to provide a substantially airtight seal with the sterilization chamber 100. Both the sterilization chamber 100 and the chamber door 102 are typically metallic with stainless steel or aluminum as common material choices but could also include polymeric or composite materials. The sterilization chamber 100 and the chamber door 102 are typically heated to 35-55° C. when hydrogen peroxide is used as the sterilant but may be heated to different temperatures or unheated for other sterilant gases.

Prior to sterilization, the items to be sterilized are thoroughly cleaned, rinsed and dried. By way of example, these items may include any of a variety of medical, surgical, or dental instruments or devices. Lumened devices including stainless steel and plastic tubes, rigid endoscopes, flexible endoscopes, and other items must be used under sanitary and germ-free conditions. After the items are cleaned, rinsed and dried, the items are then placed in packaging. The packaging may include trays, baskets, containers, silicone mats, brackets and pouches, all intended to provide a sterile barrier to the items that will be sterilized and stored until the point of use.

The packaging may be accomplished in a variety of ways, but all allow the sterilant gas or vapor to penetrate the barrier to contact the items to be sterilized within the packaging. After sterilization, the sterile packaging does not allow spores, viruses or bacteria to penetrate the now sterile packaging that would contaminate the articles rendering them no longer sterile. Packaging materials include Tyvek® pouches, trays and baskets that are overwrapped with a sterilization wrap like KimGuard™, and sterilization containers such as Genesis® containers, among other types. Tyvek® is a registered trademark of E. I. du Pont de Nemours and Company of Wilmington, Del. KimGuard™ is a registered trademark of Kimberly-Clark Worldwide, Inc. of Neenah, Wis. Genesis® is a registered trademark of CareFusion 2200 Corporation of San Diego, Calif.

A sterilization load 104 is comprised of one or more packages of items to be sterilized. The sterilization load 104 is placed inside the sterilization chamber 100 through the chamber door 102. The sterilization load 104 is typically placed on an open rack within the sterilization chamber 100 which allows sterilant to access all portions of the sterilization load 104.

An inlet valve 106 isolates the sterilization chamber 100 from the surrounding ambient air 122. The inlet valve 106 may be either normally-open, normally-closed, or a variably opening valve type. It is preferable to use a normally-open, solenoid valve for the inlet valve 106 that can be controlled by a controller 120. A normally-open valve type allows the sterilization chamber 100 to vent back to atmospheric pressure if power to the system is lost for any reason.

One or more pressure sensor(s) 114 are connected to the sterilization chamber 100 and monitored by the controller 120. The pressure sensor(s) 114 should be capable of measuring the pressure inside the sterilization chamber 100 with sufficient accuracy to resolve pressure increases due to water and outgassing from the sterilization load 104. Capacitance manometers work well in this application, as their reading is independent of the type of gas within the sterilization chamber 100.

A sterilant vapor sensor 124 is connected to the sterilization chamber 100 and monitored by the controller 120. The sterilant vapor sensor 124 should be capable of measuring the vapor concentration inside the sterilization chamber 100 over the range of 0 to 10 mg/L, but preferably even higher with sufficient accuracy to resolve variations of the sterilant concentration in the sterilization chamber 100 to within ±0.3 mg/L or better. A sensor response-time should be fast enough to resolve concentration maxima and minima and preferably has a time constant less than 1 second and most preferably has a time-constant of 0.1 second or faster. U.S. Pat. No. 7,880,887 issued Feb. 1, 2011, to Olson et al. and incorporated herein describes one such suitable example of a vapor sensor. Other types of vapor sensors could work in this application as well, provided they have sufficient range, measurement accuracy and response-time.

A vacuum pump 112 is connected to the sterilization chamber 100 through a vacuum valve 110. The vacuum valve 110 may be either normally-open, normally-closed, or a variably opening valve type. It is preferable to use a normally-closed, solenoid valve that can be controlled by the controller 120 for the vacuum valve 110. A normally-closed valve type prevents backflow from the vacuum pump 112 if power to the system is lost for any reason. The vacuum pump 112 is preferably a dry vacuum pump, such as a roots type blower, with its operation controllable by controller 120. A dry vacuum pump 112 eliminates concern for oil back-flowing into the sterilization chamber 100 or polluting the ambient air 122 with oil mist.

Sterilant is contained in a sterilant source 116, which is coupled to a vaporizer 108, through a sterilant valve 118. The vaporizer 108 is sealed and in fluid communication with the sterilization chamber 100. It is preferably heated to a temperature above the sterilization chamber 100 temperature and of sufficient heat capacity to fully vaporize the sterilant liquid entering it. The sterilant source 116 contains sufficient sterilant for a sterilization cycle. The sterilant valve 118 isolates the sterilant source 116 from the vaporizer 108. The sterilant valve 118 may be either normally-open, normally-closed, or a variably opening valve type. It is preferable to use a normally-closed, solenoid valve that can be controlled through a controller 120 for the sterilant valve 118. A normally-closed valve prevents sterilant from flowing to the vaporizer 108 if the system loses power.

The process can be controlled manually, but it is preferable to control the entire sterilization process with a controller 120. Controller 120 may take many forms but is preferably a microprocessor-based system with firmware designed specifically for this application. The controller controls the inlet valve 106, the vacuum valve 110, the sterilant valve 118 and the vacuum pump 112 and monitors system sensors including pressure sensor(s) 114. For heated systems, the controller 120 also controls heating to the chamber and vaporizer to maintain set-point temperatures.

A simple sterilization process using the system represented by the block diagram of FIG. 1 to sterilize a fully dry sterilization load 104 proceeds as follows: (1) the sterilization load 104 is placed inside the sterilization chamber 100 through the chamber door 102 which is then closed; (2) inlet valve 106 is closed, vacuum pump 112 is started and vacuum valve 110 is opened to start the chamber evacuation process; (3) pressure sensor(s) 114 monitor the pressure inside the sterilization chamber 100 until a predetermined sterilization pressure level is reached, typically in a range between 0.1 and 3 Torr and most typically ~1 Torr; (4) upon reaching the required pressure, vacuum valve 110 is closed to isolate the sterilization chamber 100 at vacuum; (5) the sterilant valve 118 is opened for a predetermined period so that sterilant is drawn out of the sterilant source 116 and routed to the vaporizer 108 by the vacuum level within the sterilization chamber 100; (6) the sterilant is vaporized in the vaporizer 108 and the vapor surrounds the sterilization load 104 inside the sterilization chamber 100; (7) after a sufficient period of time to affect sterilization of the sterilization load 104, the vacuum valve 110 is opened and any sterilant vapor in the sterilization chamber 100 is removed from the system through the vacuum pump 112; (8) the vacuum valve 110 is closed and the inlet valve 106 is opened to allow ambient air 122 to vent into the sterilization chamber 100, bringing the pressure back to atmospheric pressure; and (9) the chamber door 102 is opened and the sterilization load 104 is removed from the sterilization chamber 100.

The sterilization process described above is quite simple and an actual sterilization process may include more steps and equipment not included in this description. U.S. Pat. No. 8,366,995 issued Feb. 5, 2013, to McLaren et al. and incorporated herein describes such a sterilization process with additional equipment including filters and catalytic converters; and additional steps, including multiple injections, venting steps, and multiple exposures. In particular, the sterilization process may include water detection methods and the cycle may be canceled or move into a load-drying phase if water is detected in the sterilization load.

Figure 2:
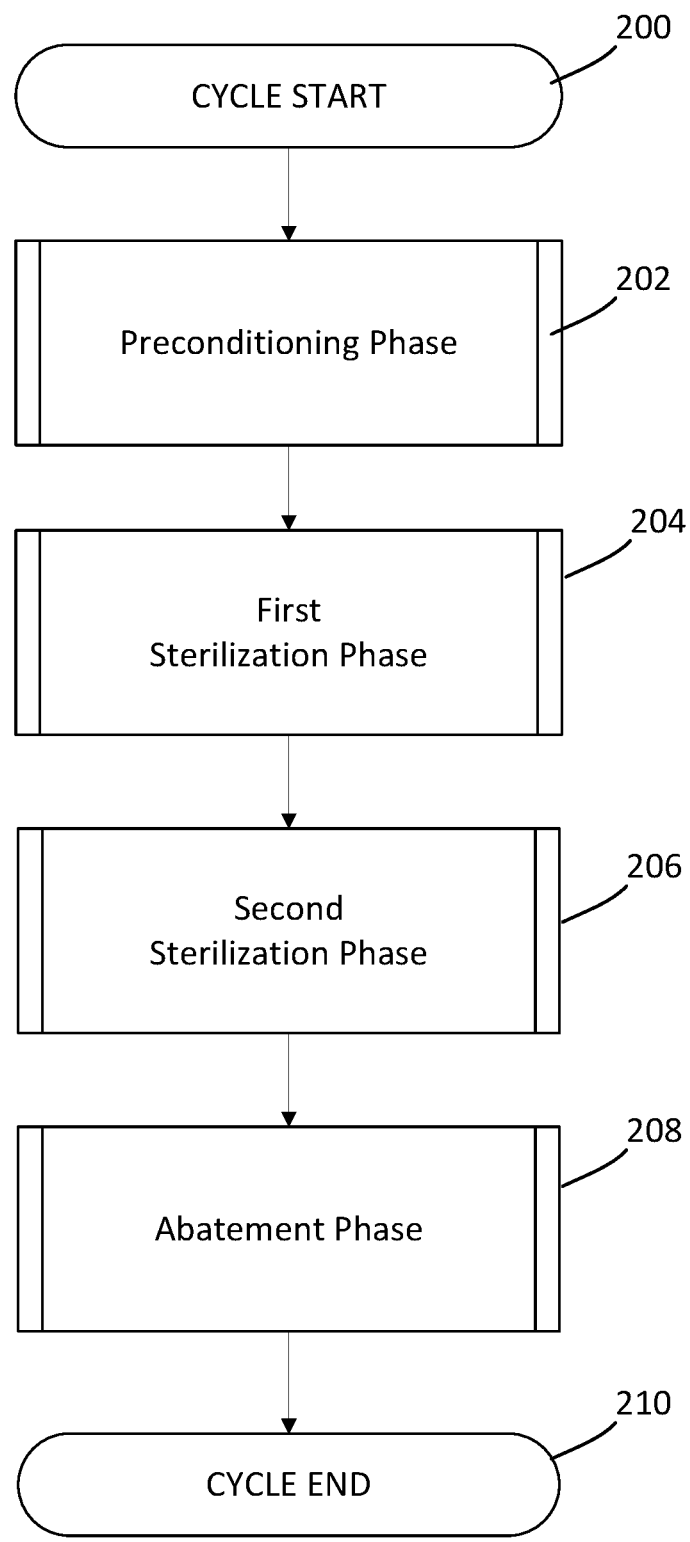
FIG. 2 is a flowchart for a typical sterilization cycle.

FIG. 2 shows a flowchart for a typical sterilization cycle. The start of sterilization cycle 200 is commonly initiated through a button press on a user interface by the operator of the sterilizer. Afterward, the sterilization process proceeds without additional user interaction through four phases described below.

First, a preconditioning phase 202 is conducted. The preconditioning phase 202 may simply reduce the pressure in the sterilization chamber 100 to a lower level suitable for a chemical-vapor sterilization process to occur, but may also contain provisions to heat the load (e.g., by venting the chamber to near atmospheric pressure and allowing the load to sit in the chamber, or use of some other heating element), check the load for moisture, or other provisions to prepare or determine that the load is ready to be sterilized. An actual sterilization preconditioning process may include more steps and equipment not included in this description. U.S. Pat. No. 10,350,319 issued Jul. 16, 2019, to Olson et al. and incorporated herein describes such a sterilization preconditioning process with pre-heating, liquid detection and load drying if liquid is detected.

Following the preconditioning phase 202, the first sterilization phase 204 is conducted. The first sterilization phase 204 is typically a series of steps that the sterilizer controller 120 has been programmed to follow to achieve sterilization of the sterilization load 104. These steps can include introduction of sterilant into the sterilization chamber 100, time-periods of holding conditions at current pressure and sterilant concentration levels, addition of a secondary gas like air in venting processes through the inlet valve 106 to raise the pressure in the chamber and evacuations using the vacuum pump 112 and vacuum valve 110 to reduce the pressure and sterilant concentration in the sterilization chamber 100. The first sterilization phase 204 is sufficient to sterilize the sterilization load 104 to at 6 log reduction.

The second sterilization phase 206 follows the first sterilization phase 204. The second sterilization phase 206 is a repeat of the conditions that were achieved in the first sterilization phase 204 and represents additional assurance that the sterilization load 104 is fully sterilized.

The final phase in the sterilization process is the abatement phase 208. The abatement phase 208 comprises steps taken to remove residual sterilant from the sterilization chamber 100 and within and on the sterilization load 104, so that the sterilization load 104 may be removed from the sterilization chamber 100 without harm to the operator or others that come in proximity to the sterilizer or in contact with the sterilization load 104.

At the completion of the abatement phase 208 the end of sterilization cycle 210 has been reached. The sterilization load 104 may be safely removed from the sterilization chamber 100.

This invention seeks to improve the diffusion of sterilant gas or vapor into lumens during portions of the first sterilization phase 204 and second sterilization phase 206. A standard lumen is a tubular structure. It is often cylindrical but can be of other geometries, with an internal surface and openings at each end. Examples of standard lumens include medical suction tubes, needles, channels within rigid or flexible endoscopes or other devices. Single-ended (or dead-ended) lumens with a single opening at one end and no opening at the other end are less common in medical devices but do occur as well.

The diffusion of sterilant gas into a lumen can be modeled as a one-dimensional, transient diffusive system with sterilant decay. The governing differential equation for such a system is given (following Donaldson & Shouman (1972)) by:

$$\frac{1}{D}\frac{\partial C}{\partial t} = \frac{\partial^2 C}{\partial x^2} + \frac{k}{D} \cdot (C - C_s)$$

where, C is the gas or vapor concentration, D is the mass diffusion coefficient, x is position, t is time, and k is a decay factor that is negative, representing the decay of hydrogen peroxide vapor concentration against the interior surface of the lumen. Note that $C_s=0$ as there is no surrounding concentration within the lumen.

The initial and boundary conditions for the model problem are given by:

Initial Condition: $t=0; C=C_i$

At Lumen Entrance: $x=0; C=C_o$

At Lumen Center: $x=L; \partial C/\partial x=0$

L is the half-length of a standard lumen or the full-length of a single-ended lumen. The general solution to this problem is given by:

$$C = C_o + (C_o - C_s) \cdot \left(\frac{\cosh m(L-x)}{\cosh mL} - 1\right) +$$
$$\frac{2}{L}\sum_{n=1}^{\infty}\left\{\sin(\lambda_n x) \cdot \left(\frac{(C_i - C_s)}{\lambda_n} - \frac{(C_o - C_s)\lambda_n}{m^2 + \lambda_n^2}\right) \cdot e^{-D(m^2 + \lambda_n^2)t}\right\} \text{ where,}$$
$$\lambda_n = \frac{(2n-1)\pi}{2L} \text{ and } m^2 = \frac{-k}{D}$$

For the case with no initial sterilant concentration in the lumen, $C_i=0, (C_s=0$ previously) the solution equation reduces to:

$$C = C_o \cdot \left(\frac{\cosh m(L-x)}{\cosh mL}\right) - \frac{2}{L}\sum_{n=1}^{\infty}\left\{\sin(\lambda_n x) \cdot \left(\frac{C_o \cdot \lambda_n}{m^2 + \lambda_n^2}\right) \cdot e^{-D(m^2+\lambda_n^2)t}\right\} \text{ or,}$$
$$\frac{C}{C_o} = \left(\frac{\cosh m(L-x)}{\cosh mL}\right) - \frac{2}{L}\sum_{n=1}^{\infty}\left\{\sin(\lambda_n x) \cdot \left(\frac{\lambda_n}{m^2 + \lambda_n^2}\right) \cdot e^{-D(m^2+\lambda_n^2)t}\right\}$$

Here, the first term in the solution represents the steady-state (or time-independent) portion of the concentration profile in the lumen. The second term in the solution can be viewed as a transient (or time-dependent) correction to the steady-state concentration profile in the lumen.

Figure 3:
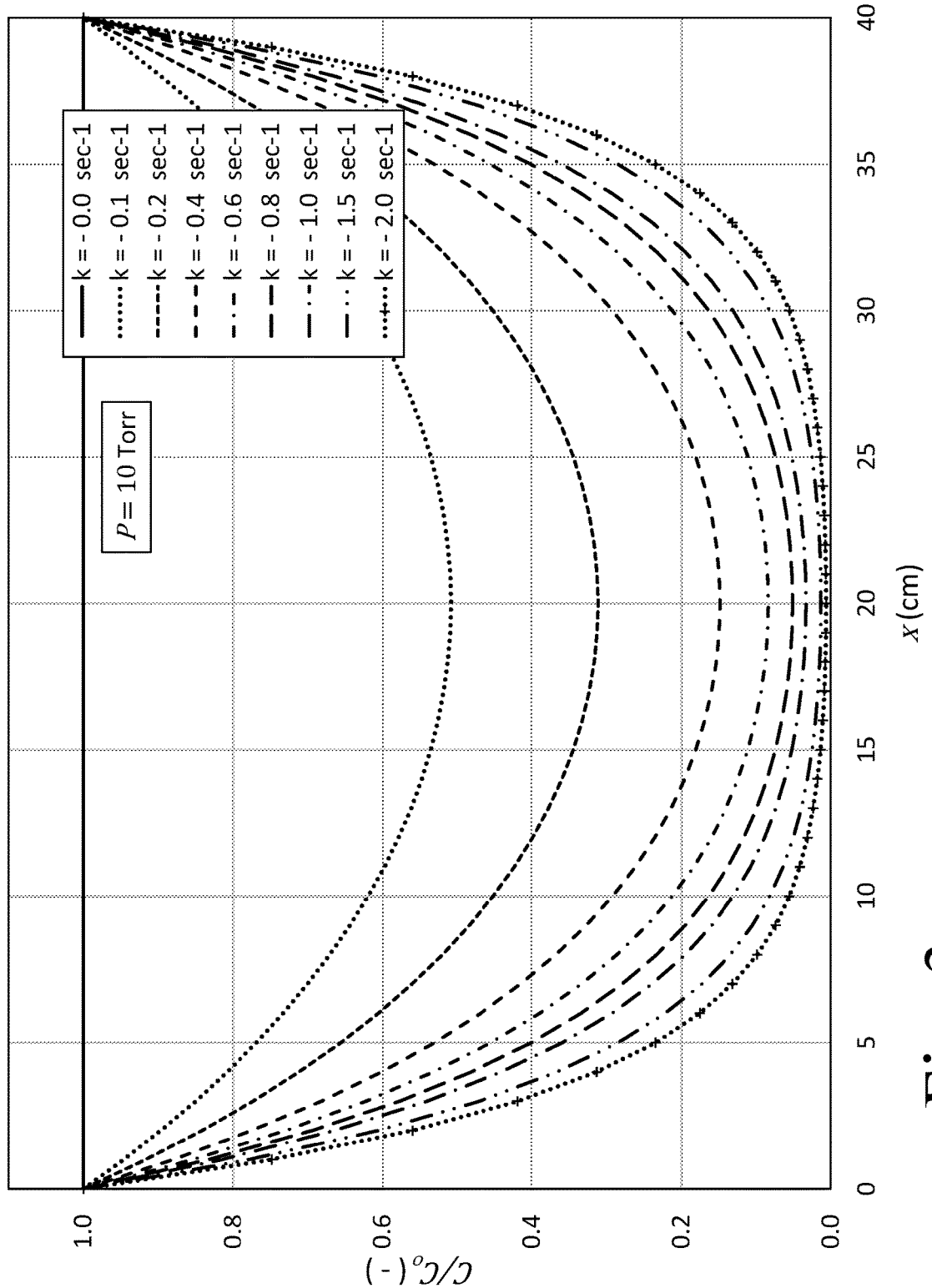
FIG. 3 is a plot showing the steady-state dimensionless concentration profile in a 400 mm lumen at 50° C. and 10 Torr for varied decay factors.

As an example, the steady-state concentration profile within a 400 mm long lumen at T=50° C. and P=10 Torr is shown in FIG. 3 for varying decay factors, k. For these calculations, the diffusion coefficient, D in cm²/s, is approximated by (following Slattery and Bird (1958)):

$$D = \frac{3.303 \times 10^{-4}(T + 273.15)^{2.334}}{P}$$

FIG. 3 shows that for a decay factor $k=-0.0$ sec$^{-1}$, the concentration throughout the lumen becomes uniform and equal to the concentration outside the lumen at steady-state. As the decay factor magnitude increases, the concentration within the lumen decreases at steady-state. For sufficiently large (negative) k, the concentration in the middle portion of the lumen approaches zero. In these cases, the concentration decays faster than it can be replenished by diffusion from outside the lumen.

A material that is highly compatible with hydrogen peroxide, like Polytetrafluoroethylene (PTFE, Teflon®), Perfluoroalkyl (PFA), or Fluoroethylene propylene (FEP) will have a decay factor near zero. Other materials will have decay factors with larger negative values. A small-diameter stainless-steel lumen has a decay factor closer to −0.4 sec$^{-1}$. This explains the relative difficulty sterilizing rigid stainless-steel lumens when compared with flexible polymer lumens.

Figure 4:
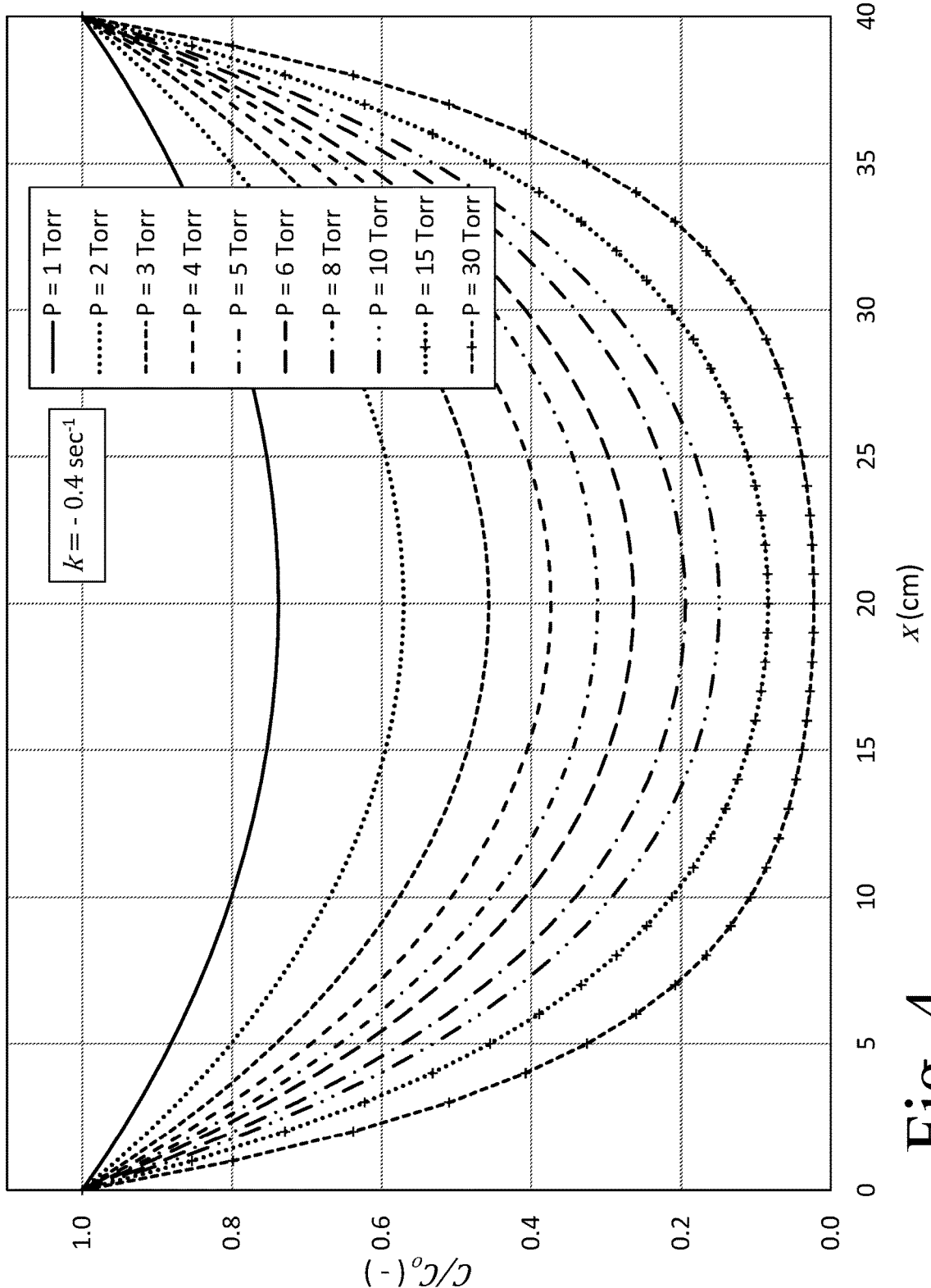
FIG. 4 is a plot showing the steady-state dimensionless concentration profile in a 400 mm lumen at 50° C. with a decay factor $k=-0.4$ $sec^{-1}$ for varied chamber pressures.

FIG. 4 shows a second example of the steady state solution for the sterilant concentration in a lumen. In this example, the decay factor is k=−0.4 sec$^{-1}$, T=50° C. and the chamber pressure is varied. The dimensionless concentration is higher for low pressure and decreases within the lumen as the pressure increases. This is due to the decrease in the diffusion coefficient, D, as pressure increases. In other words, for higher pressures, the diffusion of hydrogen peroxide in the lumen is reduced because there are more molecules to diffuse through. This suggests that the chamber pressure should be maintained at low pressure to improve diffusion.

Figure 5:
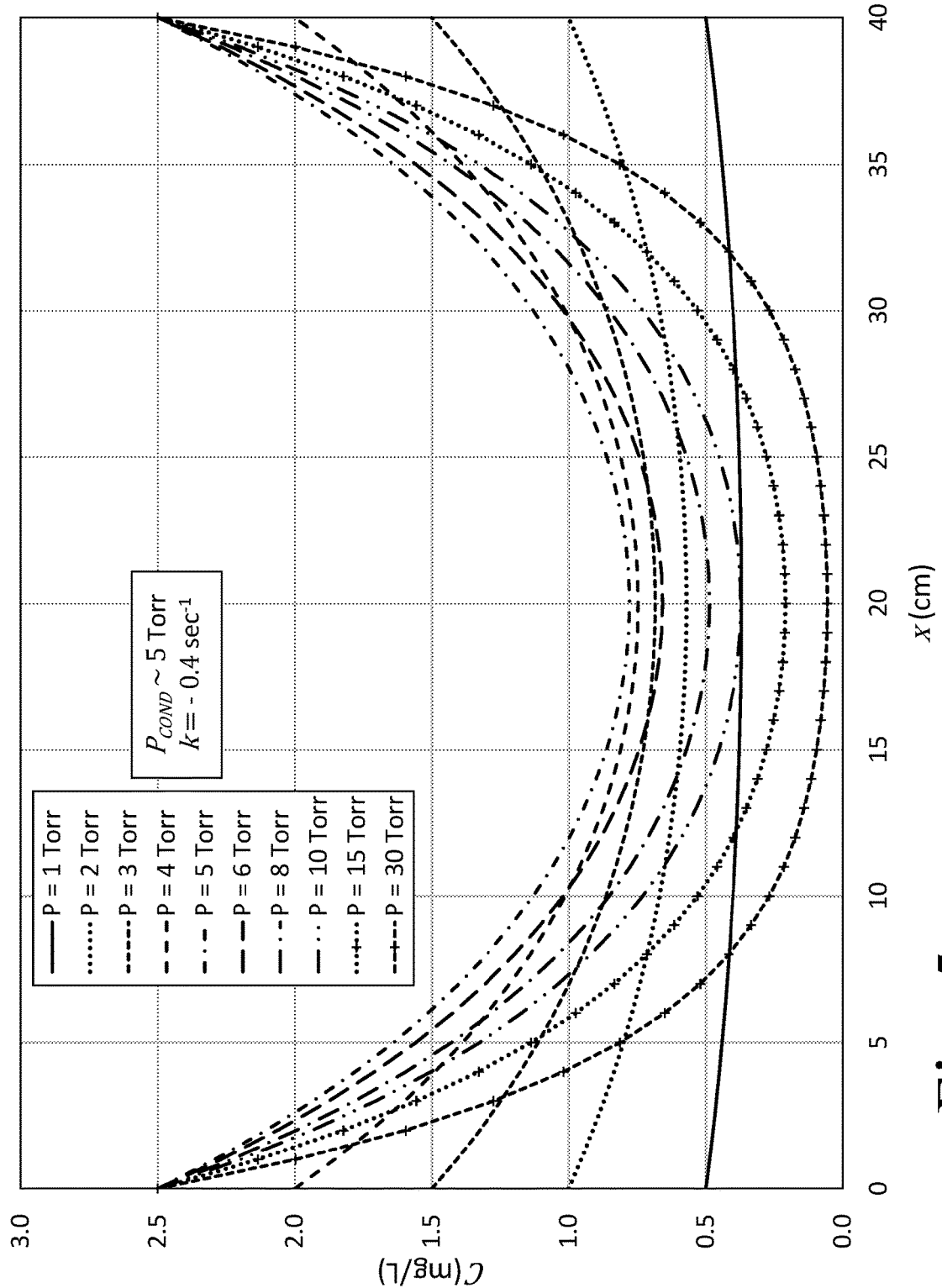
FIG. 5 is an example plot showing the steady-state concentration profile in a 400 mm lumen at 50° C. with a decay factor $k=-0.4$ $sec^{-1}$ for varied chamber pressures with $C_o$ (concentration at lumen entrance) limited by condensation on the load.

However, for low pressure the concentration outside the lumen, $C_o$, is also low, so reaching a higher fraction of the low concentration may not yield an optimal result. FIG. 5 is an example of this for the case with k=−0.4 sec$^{-1}$, T=50° C. and with the chamber pressure varied. In this example, however, the concentration outside the lumen is approximated by:

$$C_o \propto \frac{P}{2} \text{ for } P < P_{COND} \text{ and}$$
$$C_o \propto \frac{P_{COND}}{2} \text{ for } P \geq P_{COND}$$

where, $P_{COND}$ is the pressure at which condensation occurs on the load. In this example, for low pressure, $C_o$ scales with P/2. The actual scaling will depend on the liquid sterilant concentration used to generate the sterilant vapor and the condensation pressure, $P_{COND}$, will depend primarily on the load temperature, since the chamber 100 is heated. For the example in FIG. 5, the peak concentration inside the lumen occurs when P=$P_{COND}$=5 Torr. For lower pressure, $C_o$, limits the concentration in the lumen while for larger pressure, D, limits the concentration in the lumen. The optimal concentration in the lumen by diffusion can be achieved by monitoring the overall system for condensation on the load and limiting the amount of hydrogen peroxide in the chamber by terminating injections when condensation becomes the predominant outcome of further injections.

Figure 6:
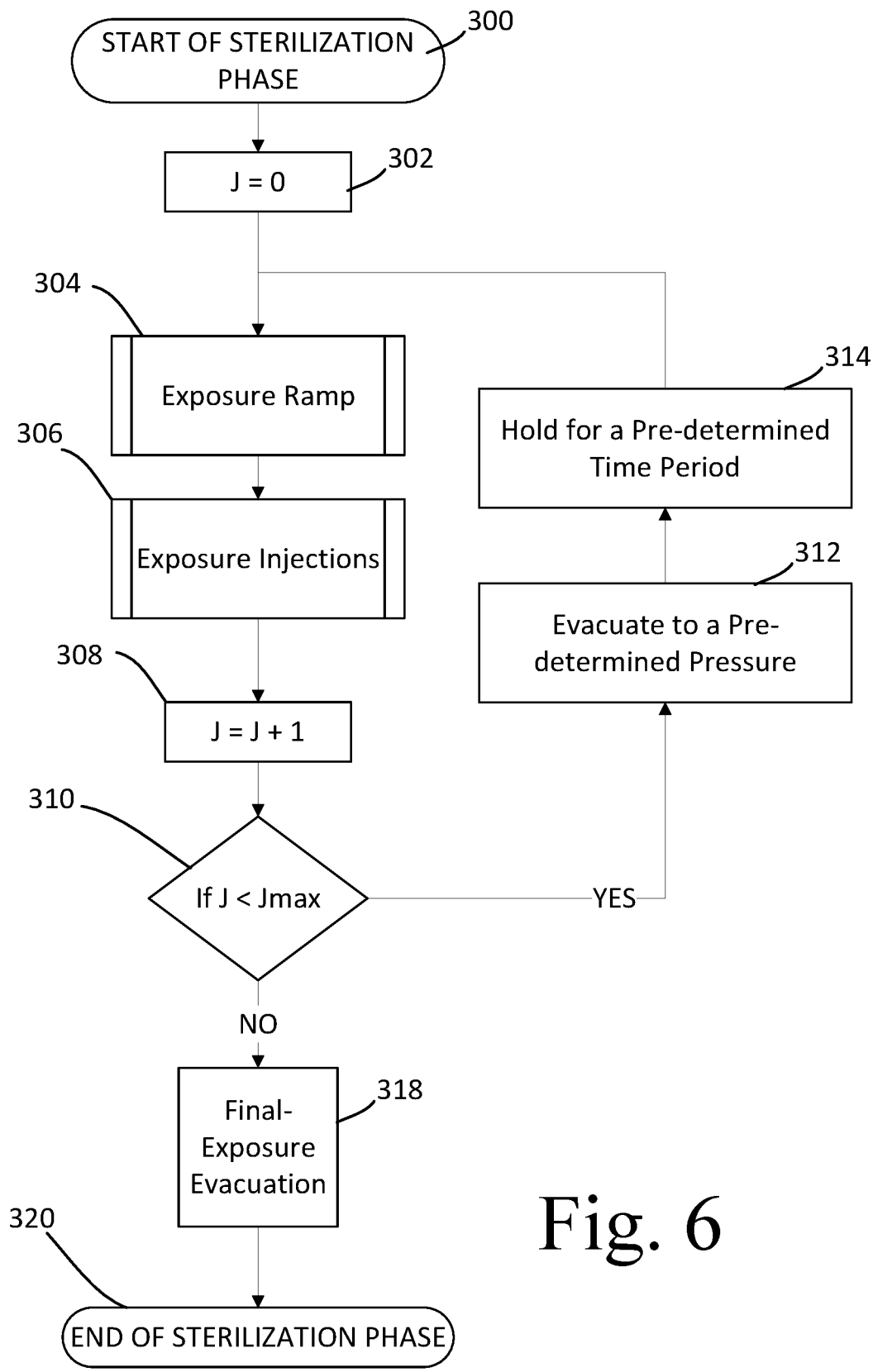
FIG. 6 is a flowchart showing the sterilization phases of a sterilization cycle.

FIG. 6 is a flow chart for the sterilization phase of a sterilization cycle that applies the information provided by the diffusion model into practice. The start of sterilization phase 300 begins the process. An exposure counter 302 is initialized. The sterilization phase will include at least one set of exposures and could contain additional sets of exposures. The exposure set is comprised of an exposure ramp 304 and exposure injections 306. These elements will be described in greater detail in subsequent figures. The exposure-counter increment 308 is increased and an exposure-limit test 310 is checked to see if additional sets of exposures should be included. If additional exposure sets will be performed, the sterilization chamber 100 is evacuated in the multi-exposure evacuation 312. The multi-exposure evacuation pressure can be between 0.1 to 5 Torr. The pressure could be chosen such that the next exposure mimics the previous exposure, but certain advantages can be found when choosing a pressure between 3 to 5 Torr with 4 Torr being a preferred pressure. Evacuating to 4 Torr, for example, causes the condensed sterilant in the sterilization chamber 100 to revaporize to form vapor sterilant. In this way some of the previously injected sterilant can be scavenged and used in the next set of exposures. The resulting vapor sterilant concentration is formed at a lower pressure than occurred previously, which increases the diffusion coefficient and improves diffusion into lumens. When the multi-exposure evacuation pressure is reached, the scavenge hold 314 is used to allow revaporization and diffusion to occur. The scavenge hold 314 may be 0 to 180 seconds and typically is 30 to 60 seconds in extent. Following the scavenge hold 314, processing returns to perform the next exposure.

Returning to the exposure-limit test 310, if no additional exposure sets are needed, a final-exposure evacuation 318 to a target pressure is performed. The final-exposure evacuation 318 typically has a target pressure between 0.4 to 1.0 Torr. Reaching the target pressure marks the end of sterilization phase 320.

Figure 7:
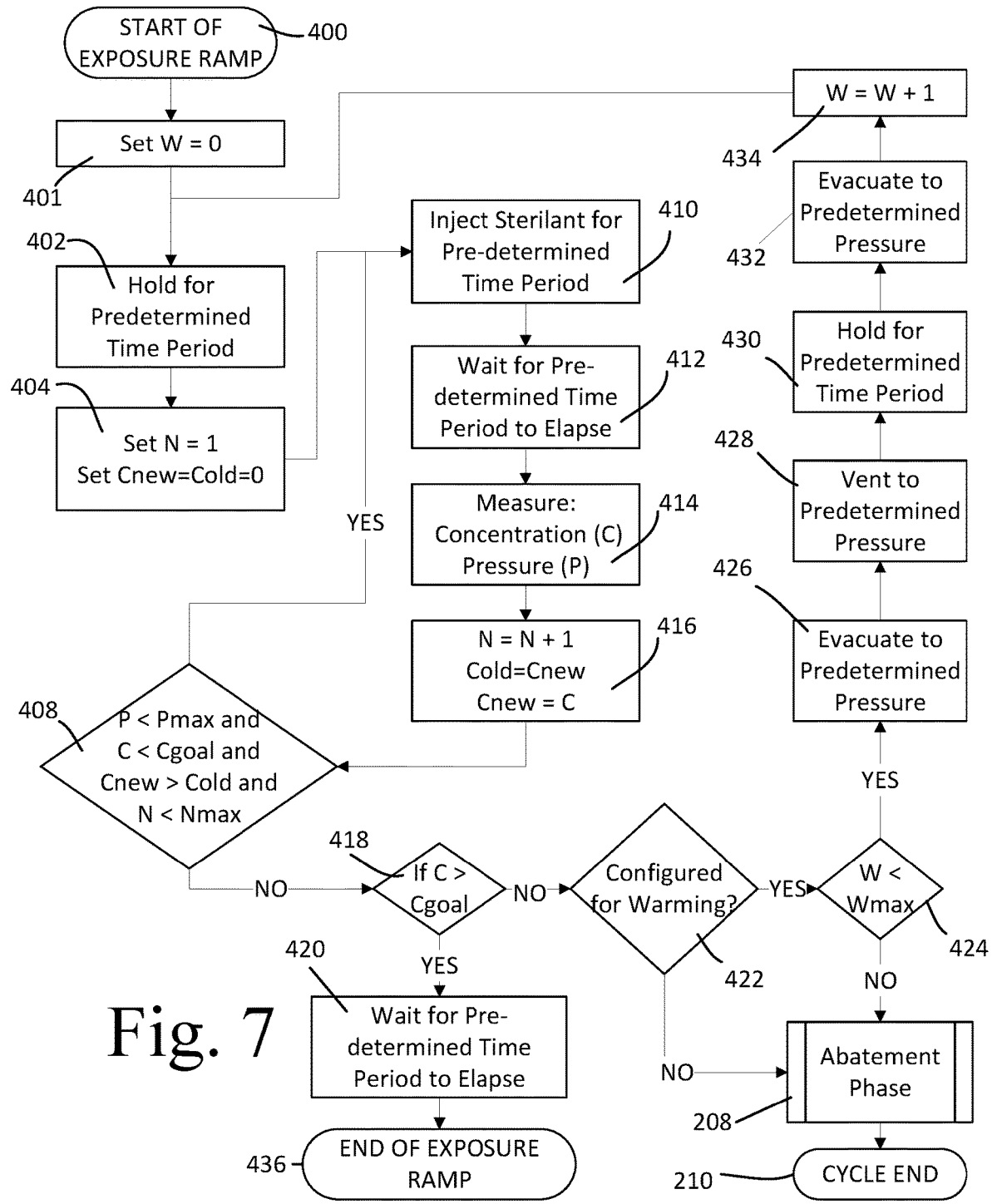
FIG. 7 is a flowchart showing the sterilant ramp portion of an exposure during the sterilization phase of a sterilization cycle.

Details of the exposure ramp 304 are given in FIG. 7. The start of exposure ramp 400 occurs when the preconditioning phase 202 reaches its target pressure for the first sterilization phase 204, or when the first sterilization phase 204 completes by reaching its target pressure for the second sterilization phase 206, or for second and subsequent exposures during either the first sterilization phase 204 or second sterilization phase 206.

A warming counter 401 is first initialized. W is a counter for the number of warming attempts that have been conducted. The evacuation hold 402 is a pre-defined period from 0 to 360 seconds during which the chamber pressure is maintained at or near the pressure at the start of exposure ramp 400. This time-period allows residual gas to diffuse out of the lumen at low pressure. The time for diffusion to occur is greater than would be predicted by the diffusion model for lumens given above due to the low pressure and small diameters of some lumens. At this point the Knudsen number, Kn<1, and molecular interactions with the lumen walls slow diffusion. In the simplest case, the evacuation hold 402 is a time-period during which the chamber is not evacuated further or vented. However, other evacuation hold 402 methods may also be performed including continuing the evacuation during the evacuation hold 402 or maintaining the pressure at the evacuation hold 402 by periodically evacuating back down to the pressure at the start of the exposure ramp 400 when it drifts higher by a pre-determined amount.

Following the evacuation hold 402, parameter initialization 404 is performed. Here, N is a counter for the number of hydrogen peroxide pulses that have occurred in exposure ramp, $C_{new}$ and $C_{old}$ are parameters used to store concentration measurements during the exposure ramp. After parameter initialization 404 the sterilant valve 118 is opened for a pre-determined time-period called the ramp-pulse time 410. The volume injected should be sufficient to raise the concentration by approximately 0.25 to 0.50 mg/L for the first pulse. For the valve used in the development of this invention, this time is 30-50 milliseconds. Other methods could be used to admit a small amount of sterilant at this step including using a predetermined amount of sterilant admitted with a pump, a syringe, or other means. The ramp-pause 412 comes next for which the conditions in the sterilization chamber 100 are allowed to stabilize for a pre-determined time-period of 1 to 5 seconds. This time-period is preferably long enough that the concentration peaks and begins to fall before the next pulse. For the system used to develop this invention a ramp-pause 412 of 3 seconds is best. Following the ramp-pause 412 the pressure and concentration are measured in the ramp-parameter check 414 using the pressure sensor(s) 114 and sterilant vapor sensor 124. The ramp-parameter update 416 updates the parameters that are used as part of the ramp-continue decision 408.

A loop is performed next based on the outcome of ramp-continue decision 408. The ramp-continue decision 408 may include one or more of the following tests and all must be true to continue the loop:

$P<P_{max}$ $C<C_{goal}$ $C_{new}>C_{old}$ $N>N_{max}$ $P_{max}$, $C_{goal}$ and $N_{max}$ are pre-determined maximal values for pressure, vapor concentration and ramp pulses that are allowed. $P_{max}$ affects the diffusion coefficient and limiting the value between 4-10 Torr may be desirable. If C is measured and greater than $C_{max}$ it usually indicates a light load or a warm load such that condensation is not occurring. In this case it may be desirable to limit the measured concentration at this point in the cycle. $N_{max}$ limits the number of pulses that will be attempted in this portion of the cycle. It can be in the rage of 10-20, but the value may be different depending on the flow rate of the sterilant valve 118. The final test, $C_{new}>C_{old}$, determines if the concentration increased after the last injection. If it didn't, adding additional pulses will only increase pressure and limit diffusion.

If the ramp-continue decision 408 passes, steps 410-416 are repeated and this sequence of steps continues until the ramp-continue decision 408 fails one or more of its tests.

Following the ramp-pulse loop, a condensation check 418 is performed. In the condensation check 418, the measured concentration is compared to a pre-determined value $C_{goal}$ that has been previously experimentally-determined to be necessary for sterilization of the sterilization load 104. If the measured concentration is less than $C_{goal}$ it indicates that excessive condensation has occurred. In this case, the warming-configuration test 422 is checked. If the cycle has not been configured to warm the load, the system will go to the abatement phase 208 to remove residual sterilant from the sterilization chamber 100 and sterilization load 104 and the cycle end 210 will be reached with a load not sterile message indicated to the user. If the cycle has been configured to warm the load, the number of warmings 424 is checked. If the maximum warming attempts have been reached, the system will again proceed to the abatement phase 208 and the cycle end 210 will be reached with a load not sterile message indicated to the user.

If the maximum number of warming attempts has not been reached, the process proceeds to the warming-abate evacuation 426. This is a sterilization chamber 100 evacuation to a predetermined pressure in the range 0.4 to 1.0 Torr, preferably an evacuation to 0.4 Torr. This removes sterilant from the sterilization chamber 100 and sterilization load 104. Following the warming-abate evacuation 426, the sterilization chamber 100 is vented to the warming-hold pressure 428, a predetermined pressure between 500 Torr to atmospheric pressure. The warming-hold pressure 428 is preferably a pressure 80 Torr less than atmospheric pressure to facilitate convective heating of the sterilization load 104 inside the sterilization chamber 100, while maintaining a slight vacuum in the sterilization chamber 100 so that vacuum seals are not compromised at the sterilization door 102. After reaching the warming-hold pressure 428, the condition is held for a predetermined time-period called the warming-hold period 430. The warming-hold period 430 should be long enough to warm the load and is between 3-10 minutes in length, typically 5 minutes in length. Following the warming-hold period 430, the sterilization chamber 100 is evacuated to a predetermined pressure called the post-warming evacuation pressure 432 that is typically 0.1 to 1.0 Torr. After reaching the post-warming evacuation pressure 432, the warming-attempts counter 434 is incremented and the process proceeds to the evacuation hold 402 to begin again.

Returning now to the condensation check 418, if the measured concentration is larger than $C_{goal}$, the exposure ramp process proceeds to a post-ramp hold 420. The post-ramp hold 420 is a time-period between 0 to 180 seconds, and typically between 30 to 60 seconds, over which the conditions in the sterilization chamber 100 are maintained to allow additional diffusion into lumens. This leads to the end of exposure ramp 436 and the sterilization exposure ramp 304 portion of the exposure is complete.

Figure 8:
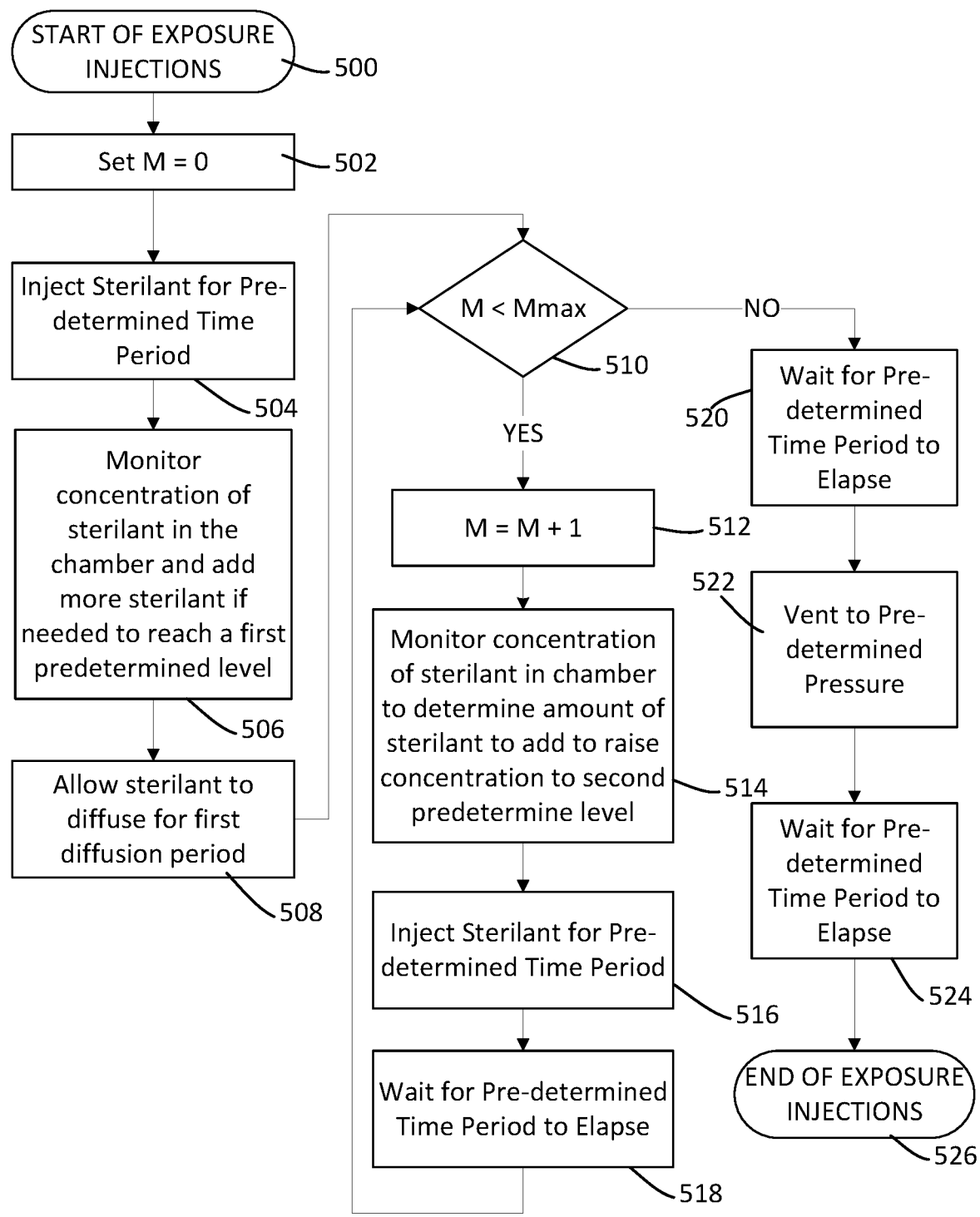
FIG. 8 is a flowchart showing the sterilant injection portion of an exposure during the sterilization phases of a sterilization cycle.

After completing the exposure ramp 304 the process moves to the exposure injections 306 as shown in FIG. 8 at start of exposure injections 500. An injection counter M is initialized to zero in injection initialization 502. Following injection initialization 502 a fixed-time injection 504 is made. The fixed-time injection period is typically 30 to 150 milliseconds, a time-period that causes the concentration to reach a desired target level of typically in the range of 2 to 6 mg/L. Other methods could be used to admit sterilant at this step including using a predetermined amount of sterilant admitted with a pump, a syringe, or other means. If this injection does not reach the target concentration an additional make-up injection 506 may be made to get there. The injection(s) are allowed to diffuse for a fixed time-period, initial-injection hold 508, has elapsed. The initial-injection hold 508 can be from 0 to 60 seconds, typically 30 seconds.

When the initial-injection hold 508 has expired, the algorithm moves to a series maintenance steps comprising injections and hold periods. The maintenance-injection test 510 is checked to determine if a maintenance injection should be conducted. Mina, can vary from 0 to 5 or more but is typically 3. If a maintenance injection is needed, the maintenance-injection counter, M, is incremented in maintenance update 512. Next, a time-period required to open the sterilant valve 118 is determined to reach a second target concentration level in maintenance-time calculator 514. The second target concentration level may be the same value as the initial concentration target level or may be larger or smaller. The sterilant valve 118 is opened for the calculated time-period during sterilant maintenance-injection 516. The sterilant maintenance-injection 516 varies and is typically between 30 to 150 milliseconds. Other methods could be used to admit sterilant at this step including using a predetermined amount of sterilant admitted with a pump, a syringe, or other means. These maintenance injections replenish sterilant in the sterilization chamber 100 and help to move sterilant into lumens by convection. Even if the second target concentration level has already been reached, a minimal maintenance injection is desired to assure convective movement of sterilant is present. Following the sterilant maintenance-injection 516, an injection hold 518 is conducted for 0 to 120 seconds, typically 30 to 60 seconds.

The maintenance-injection loop continues until the maintenance-injection test 510 fails indicating that all maintenance injections have occurred. At that point, an injection diffusion-period 520 occurs. The injection diffusion-period 520 can be from 0 to 6 minutes or more, typically 1 to 3 minutes long. Following the injection diffusion-period 520, the sterilization chamber 100 is vented in the sterilization vent 522 to a higher pressure. The sterilization vent 522 can increase pressure to 50 Torr up to atmospheric pressure but typically to 500 Torr. This allows air to compress the sterilant vapor inside lumens and can lead to sterilant condensation on internal portions of the lumen. The condition at the elevated pressure is maintained for the vent hold-period 524. The vent hold-period 524 can be from zero to 6 minutes but is preferably 30 to 180 seconds long. Following the vent hold-period 524, the end of exposure injections 526 is reached marking the end of the exposure injections 308.

Figure 9:
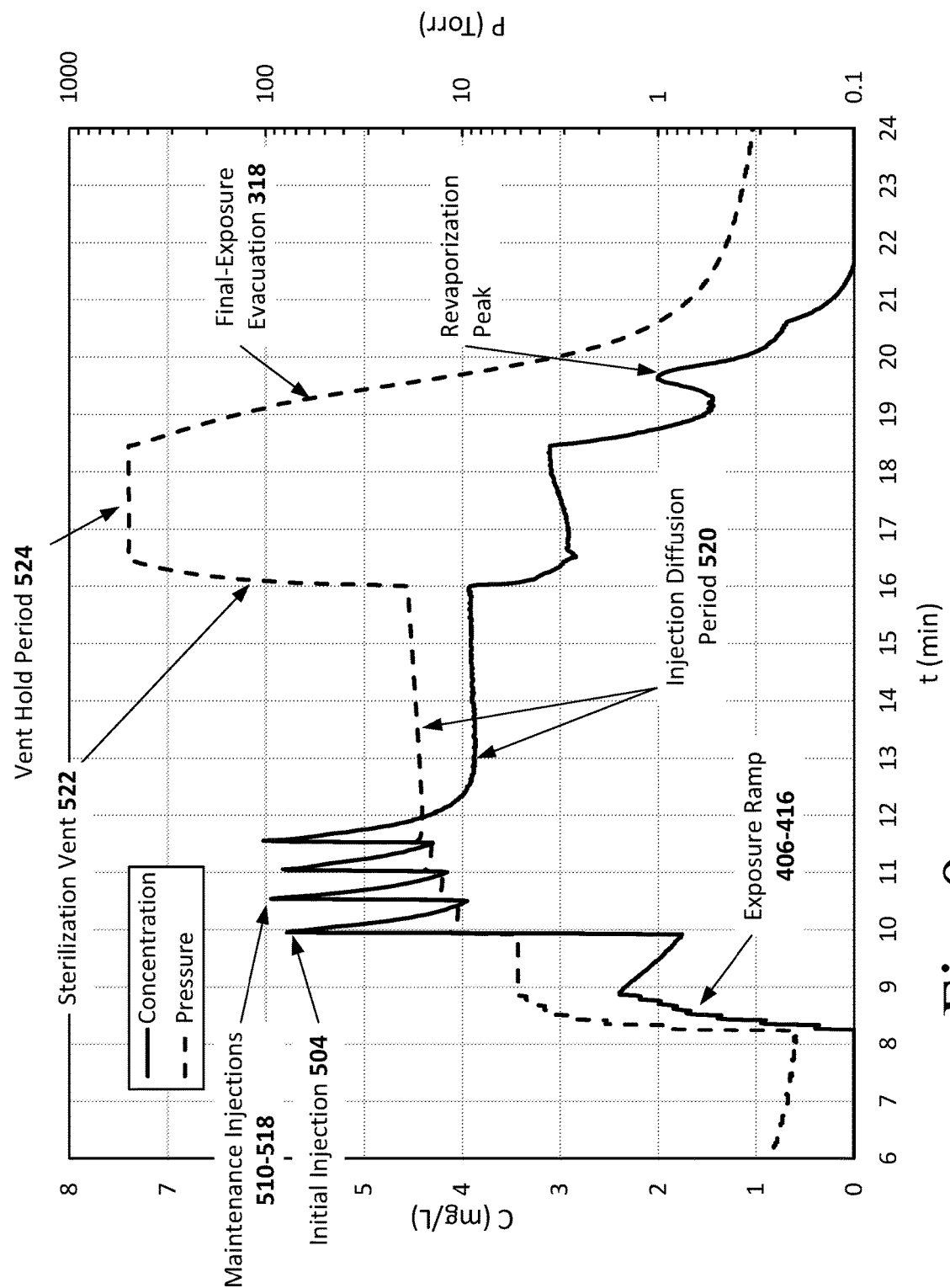
FIG. 9 is a plot showing an example of the sterilization phase with one exposure.

FIG. 9 shows an example first sterilization phase 204 with one exposure. For the exposure ramp, the ramp-continue decision 408 had limiting values of $P_{max}$=10 Torr, $C_{goal}$=2.3 mg/L, and $N_{max}$=20. In this example, the ramp completed 20 injections produced by 40 millisecond valve open times spaced 3 seconds apart. During the exposure ramp injections, the injections produced progressively smaller concentration increases. This indicates condensation is beginning to form on the load. In this test, the post-ramp hold 420 was 60 seconds, and the algorithm moves on to the sterilant exposure injections after that time period. In this test, there was one initial injection 504 followed (after a 30 second first diffusion period 508) by 3 maintenance injections spaced 30 seconds apart. The injection diffusion-period 520 was 4.5 minutes during which sterilant and air are not added or removed from the sterilization chamber 100. The sterilization vent 522 to 500 Torr was followed by a vent hold-period 524 of 2 minutes. The last step in the sterilization phase is the final-exposure evacuation 318, during which sterilant and gases are removed from the sterilization chamber 100 through the vacuum pump 112 by way of vacuum valve 110.

As shown in FIG. 9, specifically during the time immediately after the sterilization vent 522, the sterilant concentration drops. This decrease is simply due to the air venting into the chamber, displacing sterilant gas in the measurement region. Later, the sterilant concentration increases during the vent hold-period 524. This increase is due to the displaced sterilant gas or vapor diffusing back throughout the sterilization chamber. Finally, at the beginning of the final-exposure evacuation 318, the sterilant concentration decreases as it is removed from the sterilization chamber 100. However, as the pressure decreases during the evacuation, the sterilant concentration increases to a new peak and then again decreases. The increase, peak and decrease in sterilant concentration is due to condensed sterilant on the sterilization load 104 that revaporizes forming sterilant vapor. Eventually, all the sterilant vapor and revaporized sterilant are exhausted from the sterilization chamber and the vapor concentration drops to zero.

Figure 10:
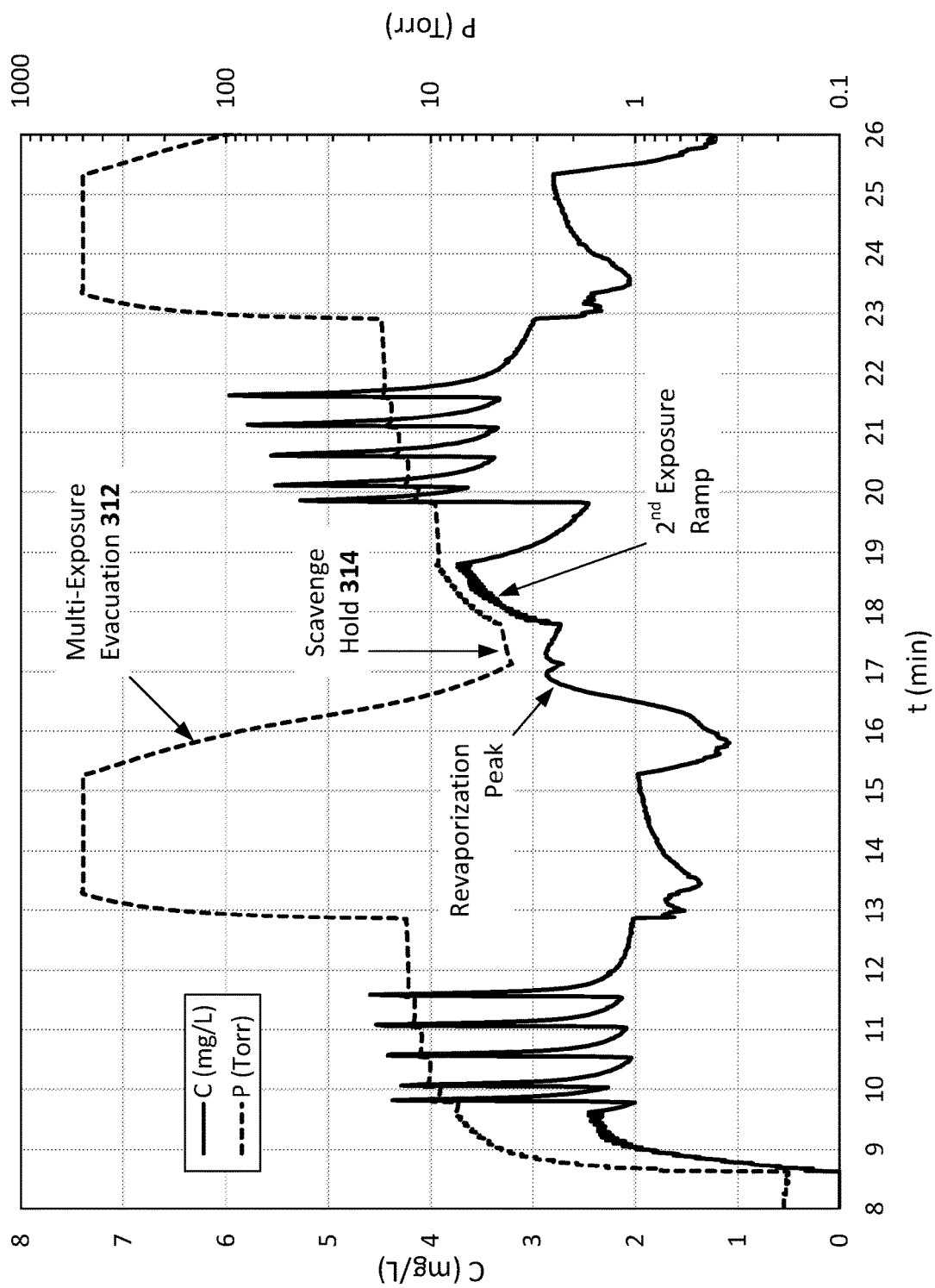
FIG. 10 is a plot showing an example of the sterilization phase with sterilant scavenging between exposures.

FIG. 10 shows a second example of a first sterilization phase 204 with two exposures. This figure is focused on the period at the end of the first exposure and beginning of the second exposure. In this example, the multi-exposure evacuation 312 is conducted to a pressure of 4 Torr. At this point, the concentration is higher, and the pressure is lower than during any comparable point in the first exposure ramp. Higher concentration and lower pressure both improve sterilant diffusion into lumens and shown in FIGS. 3-5. The scavenge hold 314 of 45 seconds holds the conditions in the sterilization chamber to allow diffusion into lumens. Following the scavenge hold 314, a second exposure ramp begins as part of the second exposure of this sterilization phase. Employing such a scavenging method can lead to improved diffusion, while also reducing peroxide use and cycle time.

Since other modifications and changes varied to fit particular operating requirements and environments will be apparent to those skilled in the art, the invention is not considered limited to the examples chosen for purposes of disclosure and covers all changes and modifications which do not constitute departures from the true spirit and scope of this invention.

Having thus described the invention, what is desired to be protected by Letters Patent is presented in the subsequently appended claims.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded.

A reference to an element by the indefinite article "a" does not exclude the possibility that more than one of the element is present, unless the context clearly requires that there be only one of the elements.

We claim:

1. A method for sterilizing a load comprising:
   a. providing a sterilization apparatus including a sterilization chamber, a sterilization chamber door, door seals, an inlet valve, a vaporizer, a vacuum valve, a vacuum pump, a pressure sensor, a vapor sensor, a source of sterilant, and a sterilant valve;
   b. placing the load in the chamber and subjecting the load to a predetermined number of sterilization phases, each said sterilization phase comprising:
      i. performing an evacuation hold wherein the chamber is held at a desired pressure for a first predetermined period of time;
      ii. creating an exposure ramp inside the chamber by continuing to inject a series of pulses of sterilant into the chamber for so long as a ramp-continue test performed after each of the series of pulses is passed, wherein said ramp-continue test is selected from a group of tests consisting of at least one of (a) determining whether a vapor concentration in the chamber is less than a predetermined concentration, (b) determining whether a number of pulses is less than a predetermined number of pulses, and (c) determining whether the concentration after each pulse results in an increased concentration level, wherein each such pulse is delivered by holding the sterilant valve open for a ramp-pulse time and then holding the sterilant valve closed for a ramp-pause time, said ramp-pulse time based on an amount of sterilant to be injected into the chamber and said ramp-pause time sufficient in length to allow conditions within the chamber to stabilize;
      iii. checking that a concentration of sterilant meets a minimum threshold and if so, maintaining the conditions in the chamber for a post-ramp hold time, and
      iv. performing a test injection of sterilant by opening the sterilant valve for a fixed-time injection period and then closing the sterilant valve and, if necessary, make-up injections until the concentration of sterilant in the chamber has reached a target concentration;
      v. once the target concentration has been reached in the chamber, pausing for an injection hold period; and
      vi. performing maintenance steps, each comprising a maintenance injection and a maintenance hold period, for so long as a maintenance step test performed after each maintenance injection is passed, each maintenance step test comprising comparing a number of maintenance injections delivered to a predetermined number of maintenance injections.

2. The method of claim 1 further comprising a step of subjecting the load to a preconditioning phase before subjecting the load to a first of said predetermined number of sterilization phases, said preconditioning phase comprising preheating the load, detection of liquid, and load drying if liquid is detected.

3. The method of claim 2 wherein said preconditioning phase further comprises adjusting the pressure within the chamber to a target pressure.

4. The method of claim 1 wherein the ramp-continue test further comprises determining if the pressure in the chamber is less than a predetermined pressure.

5. The method of claim 1 wherein the provided sterilization apparatus also includes a controller adapted to receive and process signals generated by said pressure sensor and said vapor sensor, and further adapted to control the inlet valve, vacuum valve and sterilant valve based upon such signals and a programmed set of instructions.

6. The method of claim 1 wherein the source of sterilant is a container of aqueous hydrogen peroxide and said aqueous hydrogen peroxide is vaporized by the vaporizer prior to being injected into the chamber.

7. The method of claim 1 further comprising subjecting the load to an abatement phase, following at least a last of the predetermined number of sterilization phases, and thereby removing residual sterilant from the sterilization chamber and within and on the sterilization load.

8. The method of claim 1 wherein the first predetermined period of time is greater than 0 seconds and less than or equal to 180 seconds.

9. The method of claim 1 wherein said predetermined ramp-pulse time for a first of said series of pulses is sufficient to raise the concentration by approximately 0.25 to 0.50 mg/L.

10. The method of claim 1 wherein said predetermined ramp-pause time is between 1 and 5 seconds.

11. The method of claim 1 wherein said predetermined post-ramp hold time is less than or equal to 180 seconds.

12. The method of claim 1 wherein said fixed-time injection period is of a duration sufficient to causes the concentration to reach a target level of approximately 4 mg/L.

13. The method of claim 1 wherein said injection hold period is less than or equal to 60 seconds.

14. The method of claim 1 wherein, when performing the maintenance steps, the duration of each maintenance injection is individually determined based on a length of time the sterilant valve should be held open should be held open when performing that maintenance injection to raise the concentration level to a target concentration level to be achieved by performing that maintenance injection.

15. The method of claim 1 wherein maintenance hold period following each maintenance injection is less than or equal to 120 seconds.

16. The method of claim 1 further comprising performing a warming subroutine prior to performing the evacuation hold, said warming subroutine comprising evacuating the chamber to a predetermined pressure to remove sterilant from the sterilization chamber and the sterilization load, venting the chamber to a warm-hold pressure to facilitate convective heating of the sterilization load inside the sterilization chamber without compromising the door seals, pausing for a warming-hold period, and following the warming hold period evacuating the sterilization chamber to a predetermined post warming evacuation pressure.

17. The method of claim 16 further comprising abating the sterilization chamber and the load, when the warming subroutine has been performed a predetermined maximum number of times, thereby removing residual sterilant from the sterilization chamber and within and on the sterilization load.

18. A method for sterilizing a load comprising:
a. Providing a sterilization apparatus including a sterilization chamber, a sterilization chamber door, a door seal, an inlet valve, a vaporizer, a vacuum valve, a vacuum pump, a pressure sensor, a vapor sensor, a source of sterilant, a sterilant valve, and a controller adapted to receive and process signals generated by said pressure sensor and said vapor sensor and further adapted to control the inlet valve, vacuum valve and sterilant valve based upon such signals and a programmed set of instructions;
b. Placing the load in the chamber and subjecting the load to a preconditioning phase comprising preheating the load, detecting a presence of liquid, and drying the load if liquid is detected;
c. Subjecting the load to a predetermined number of sterilization phases, each said sterilization phase comprising:
  i. performing an evacuation hold wherein the chamber is held at a desired pressure for a first predetermined period of time;
  ii. creating an exposure ramp inside the chamber by continuing to inject a series of pulses of sterilant into the chamber for so long as a ramp-continue test performed after each pulse is passed, wherein said ramp-continue test is selected from a group of tests consisting of at least one of (a) determining whether a vapor concentration in the chamber is less than a predetermined concentration, (b) determining whether a number of pulses is less than a predetermined number of pulses, and (c) determining whether the concentration after each pulse results in an increased concentration level, wherein each such pulse is delivered by holding the sterilant valve open for a ramp-pulse time and then holding the sterilant valve closed for a ramp-pause time, said ramp-pulse time based on an amount of sterilant to be injected into the chamber and said ramp-pause time sufficient in length to allow conditions within the chamber to stabilize and a concentration of sterilant in the chamber to begin to fall;
  iii. maintaining the conditions in the chamber for a post-ramp hold time while performing a condensation test to determine whether a level of condensation is acceptable for effective sterilization, and if so, performing a test injection of sterilant by opening the sterilant valve for a fixed-time injection period and then closing the sterilant valve and, if necessary, make-up injections until the concentration of sterilant in the chamber has reached a target concentration;
  iv. once the target concentration has been reached, maintaining conditions in the chamber for an injection hold period; and
  v. performing maintenance steps, each comprising a maintenance injection and a maintenance hold period, for so long as a maintenance step test performed after each maintenance injection is passed, each maintenance step test comprising comparing a number of maintenance injections delivered to a predetermined number of maintenance injections;
d. subjecting the load to an abatement phase, following at least a last of the predetermined number of sterilization phases, and thereby removing residual sterilant from the sterilization chamber and within and on the sterilization load.

19. The method of claim 18 wherein the ramp-continue test further comprises determining if the pressure in the chamber is less than a predetermined pressure.

20. The method of claim 18 further comprising performing a warming subroutine prior to performing the evacuation hold and subjecting the load to the abatement phase when the warming subroutine has been performed a predetermined maximum number of times, said warming subroutine comprising evacuating the chamber to a predetermined pressure to remove sterilant from the sterilization chamber and the sterilization load, venting the chamber to a warm-hold pressure to facilitate convective heating of the sterilization load inside the sterilization chamber without compromising the door seals, pausing for a warming-hold period, and following the warming hold period evacuating the sterilization chamber to a predetermined post warming evacuation pressure.

* * * * *